United States Patent [19]

Jackson

[11] Patent Number: 4,516,401
[45] Date of Patent: May 14, 1985

[54] SUPERCHARGED ENGINE CHARGE CONTROL

[75] Inventor: John S. Jackson, Troy, Mich.

[73] Assignee: General Motors Corporation, Detroit, Mich.

[21] Appl. No.: 548,709

[22] Filed: Nov. 4, 1983

[51] Int. Cl.³ .............................................. F02B 37/12
[52] U.S. Cl. ....................................................... 60/602
[58] Field of Search ................ 60/600, 601, 602, 603, 60/611; 123/425, 564

[56] References Cited

U.S. PATENT DOCUMENTS

| | | | |
|---|---|---|---|
| 1,653,877 | 12/1927 | Schaff | 123/564 X |
| 3,977,373 | 8/1976 | Sand. | |
| 4,063,538 | 12/1977 | Powell et al. | |
| 4,116,175 | 9/1978 | Sand. | |
| 4,197,711 | 4/1980 | Fuhrmann et al. | 60/602 |
| 4,322,948 | 4/1982 | Emmenthal et al. | 60/602 |
| 4,387,571 | 6/1983 | Katsumata et al. | 60/602 |
| 4,397,285 | 8/1983 | O'Neill | 123/425 X |
| 4,483,146 | 11/1984 | Morikawa | 60/602 |

FOREIGN PATENT DOCUMENTS 5813127 1/1983 Japan.

*Primary Examiner*—Michael Koczo
*Attorney, Agent, or Firm*—Robert J. Outland

[57] ABSTRACT

A supercharged internal combustion engine is provided with charge pressure control means, such as a turbocharger wastegate valve, to control engine charging pressure and a control system for actuating the charge pressure control means to vary charge pressure as a function of the deviation of the location of peak pressure in the engine cylinder relative to a desired value in order to control engine combustion rate and thereby the peak pressure location.

2 Claims, 3 Drawing Figures

SUPERCHARGED ENGINE CHARGE CONTROL

TECHNICAL FIELD

This invention relates to supercharged internal combustion engines and to control of charge pressure for such engines. More particularly the invention relates to maintaining desired timing of combustion chamber peak pressure through control of engine charging pressure to improve or optimize the performance and/or efficiency of supercharged engines.

BACKGROUND

It is known in the art relating to supercharged engines to provide means for controlling the charging pressure supplied by the supercharger to the engine induction system, or charge supply system, in order to desirably control engine operating conditions. For example, in turbo-supercharged (turbocharged) engines, compressor outlet relief valves and exhaust turbine bypass (wastegate) valves are among devices which have been utilized to limit the engine charging pressure for various purposes. Commonly such valves are directly responsive to compressor discharge (boost) pressure to provide a maximum charge pressure limit within desirable engine operating capabilities. In addition, a wastegate valve can be actuated by an engine knock sensor to control maximum charge pressure as a function of the occurrence of knock. Knock control has also been accomplished in both supercharged and unsupercharged spark ignition engines by controlling engine ignition timing.

It has also been suggested in the prior art that engine performance can be optimized by maintaining constant a predetermined angular position of peak cylinder, or combustion chamber, pressure as it relates to a predetermined point in the cycle, such as the instant of minimum combustion chamber volume, or what is commonly known in piston engines as the top dead center position of the piston. For example, U.S. Pat. No. 4,063,538 Powell et al, granted Dec. 20, 1977, discusses optimization of engine performance through maintenance of a constant location of peak cylinder pressure utilizing automatic adjustment of engine spark timing to accomplish this purpose.

In each case, the various operating systems and controls are based upon the recognition of a significant functional relation between the engine parameter which is being controlled and the desired result of that control.

SUMMARY OF THE INVENTION

The present invention provides a method and means for optimizing or improving the performance and/or efficiency of supercharged internal combustion engines. The method involves limiting or control of the engine charging pressure in response to deviations of the angular location of peak combustion chamber pressure from a desired reference value.

In a preferred embodiment, a turbocharged spark ignited internal combustion engine has a wastegate valve controlled at least in part, by location of peak pressure means which adjust the engine charging pressure to maintain, or move in the direction of maintaining, the location of peak pressure at a desired constant or variable value. This value is commonly expressed as an angular difference or deviation of the engine crankshaft rotational position from the top dead center position of minimum combustion chamber volume for the measured cylinder.

The method and apparatus of the present invention are based upon the recognition that there is a functional relationship between the charging pressure in the engine charge supply system and the resulting angular location of peak pressure in the engine cylinder or combustion chamber. This relationship is considered to result from the variation in burning rates occurring at different cylinder pressures which result from related variations in engine charging pressures. The functional relationship thus defined permits the utilization of charge supply pressure control as a means for varying combustion rates and the resultant peak pressure location, as will hereinafter be more fully described.

These and other features and advantages of the invention will be more fully understood from the following description of a preferred embodiment taken together with the accompanying drawings.

DRAWING DESCRIPTION

DETAILED DESCRIPTION

Figure 1:
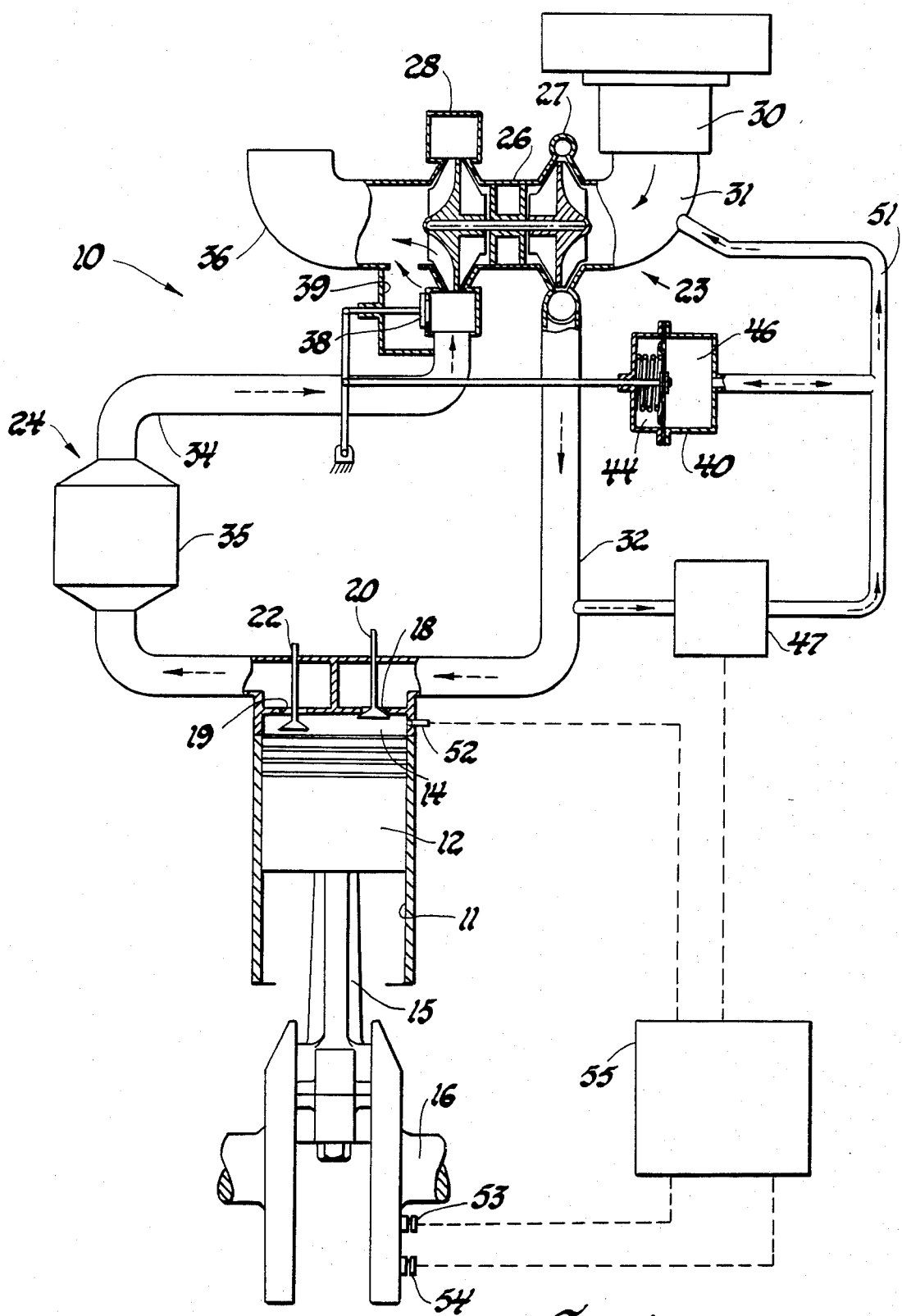
FIG. 1 is a schematic representation of a turbocharged spark ignited internal combustion engine having location of peak pressure based charge control in accordance with the invention.

Referring now to the drawings in detail, numeral 10 generally indicates an internal combustion engine formed in accordance with the invention. Engine 10 includes a closed end cylinder 11 in which a piston 12 is carried for reciprocation so as to define, at the closed end of the cylinder, a variable volume combustion chamber 14. A connecting rod 15 connects the piston with a crankshaft 16 for the delivery of power and conversion of reciprocating piston motion into rotary crankshaft motion in conventional fashion. The closed end of the cylinder 11 is provided with intake and exhaust ports 18, 19 opening to the combustion chamber and controlled by intake and exhaust poppet valves 20, 22, respectively.

An intake charge system 23 connects with the intake port 18 to supply charges to the engine combustion chamber for compression and burning. An exhaust system 24 connects with the exhaust port for carrying away exhaust products forced out through the port. A turbocharger 26 includes a compressor 27 and a turbine 28 respectively connected in the engine intake and exhaust systems for purposes to be subsequently described.

The engine intake charge system 23, which may also be called the charge supply system or induction system, includes a carburetor 30 or other suitable charge forming device capable of providing combustible air-fuel mixtures. The carburetor is connected downstream with a low pressure intake duct 31 which connects in turn with the inlet of the turbocharger compressor 27. The outlet of the compressor connects with a high pressure intake duct 32 that connects in turn with the cylinder intake port 18.

The engine exhaust system 24 includes a high pressure exhaust duct 34 which, preferably, incorporates a catalytic exhaust treatment device 35 and connects the cylinder exhaust port 19 with the inlet of the turbine 28 of the turbocharger. The turbocharger outlet connects through a low pressure exhaust pipe 36 with atmosphere.

Figure 2:
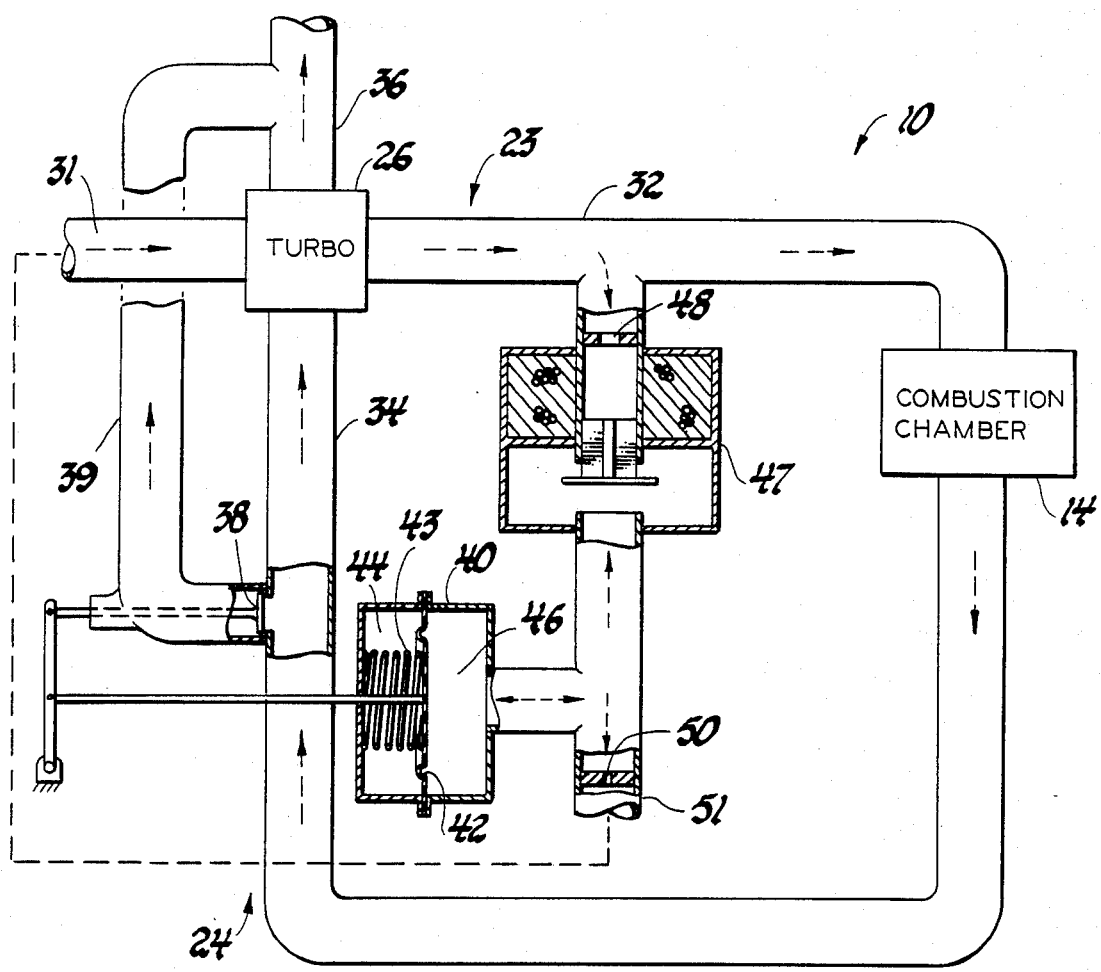
FIG. 2 is a fragmentary schematic view illustrating operation of the wastegate control means of FIG. 1.

As is best shown schematically in FIG. 2, a wastegate, or bypass, valve 38 is provided in the high pressure exhaust duct 34 near the turbine inlet. Valve 38 is openable to permit the bypassing of exhaust gas through a bypass passage 39 around the turbine. The closing and opening action of the valve 38 is controlled by an actuator 40 having a diaphragm 42 that is biased in a valve closing direction by a spring 43. Ambient pressure in a chamber 44 containing and acting in the direction of, the spring is opposed by control pressure in pressure chamber 46 acting in a valve opening direction.

The pressure chamber 46 connects through a solenoid valve 47 with the high pressure intake duct 32, which conducts charges at the cylinder charging pressure from the compressor outlet to the engine cylinder. A control orifice 48 may be provided within the connecting passages or the solenoid valve to limit the rate of fluid flow from the high pressure intake duct to the wastegate actuator. A bleed orifice 50, or other suitable restriction, is provided in a return duct 51, which connects the pressure chamber 46 of the wastegate actuator with the low pressure intake duct 31, to permit a severely limited flow of fluid therethrough for control purposes to be subsequently described.

In accordance with the invention, engine 12 is further provided with location of peak pressure (LPP) means including a cylinder pressure sensor 52, an engine speed sensor 53, a rotational position sensor 54 and suitable control means such as a control unit 55 connected to receive inputs from the pressure, speed and rotational position sensors and to supply controlling currents to the proportional solenoid valve 47. The pressure, speed and rotational position sensors may be of any suitable types, of which a number are known in the art, capable of carrying out their desired functions to be subsequently described. The control unit 55 may likewise include any suitable form of control system capable of converting the inputs from the various sensors into appropriate form and delivering suitable solenoid operating currents for accomplishing the desired purposes.

Figure 3:
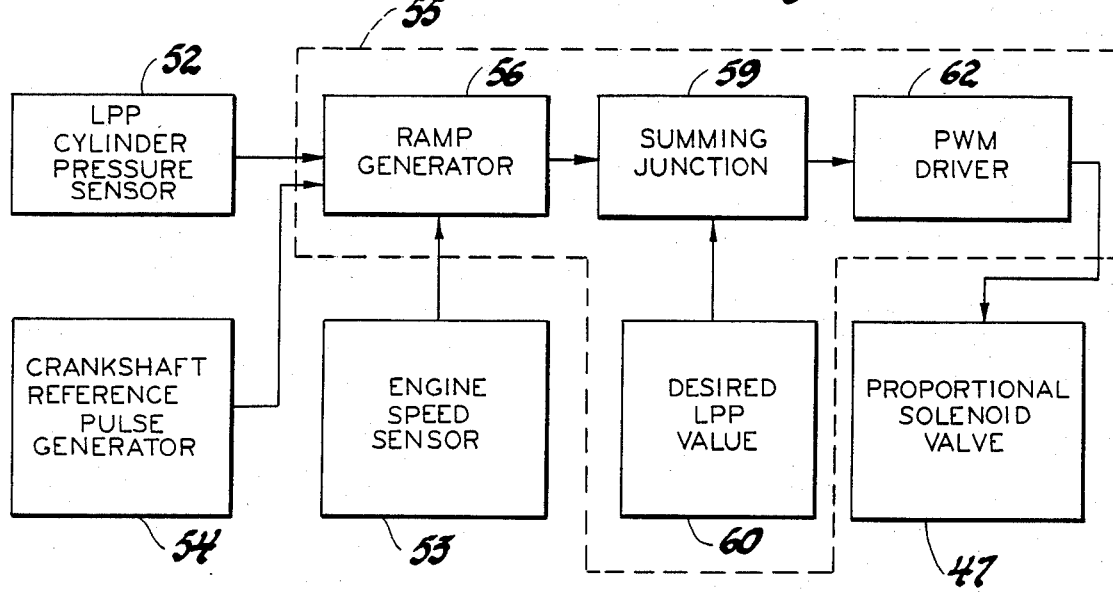
FIG. 3 is a diagrammatic view illustrating a form of control means usable for the control unit of FIG. 1.

As an example, there is illustrated in FIG. 3 an appropriate control system wherein the pressure sensor 52, speed sensor 53 and position sensor 54 are connected with a ramp generator 56. The ramp generator 56 feeds a summing junction 59, which is also fed by a reference voltage generator 60. The output of the summing junction is fed to a pulse width modulating (PWM) driver 62 that is, in turn, connected with the proportional solenoid valve 47.

In operation of the engine 10, charges of air-fuel mixture supplied by the carburetor 30 are raised to a higher charging pressure by the turbocharger compressor 27 and delivered through the valve controlled intake port 18 to the engine combustion chamber 14. Here, the charges are cyclically compressed, ignited by suitable ignition means not shown, burned and expanded to produce power for delivery to the engine crankshaft. Thereafter, the burned charges are cyclically discharged through the exhaust port 19, passed through the high pressure duct 34 to the turbine 28 for driving the turbocharger and, thereafter, discharged through the exhaust pipe 36.

If the engine charging pressure, sometimes called the turbocharger boost pressure, reaches a predetermined value, and the solenoid valve 47 is in a sufficiently open position, charging pressure will be delivered to the pressure chamber 46. This pressure will urge the diaphragm 42 against the force of spring 43 to move the wastegate, or bypass, valve 38 in an opening direction. This will allow some of the engine exhaust gases to bypass the turbine through the bypass passage 39 and thus limit the increase of charging pressure by the turbocharger to a predetermined desired maximum. The bleed orifice 50 is sufficiently smaller than the control orifice 48 to permit substantially full charging pressure to be delivered to the pressure chamber 46 without being seriously reduced by the bleed flow through the orifice 50.

In accordance with the invention, the arrangement disclosed also operates to reduce or control the level of engine charging pressure in order to control the angular crankshaft position at which the peak pressure occurs during each cylinder cycle. Measurement of peak pressure location is with respect to a reference position such as the piston top dead center where the combustion chamber volume is a minimum. To accomplish this, the proportional solenoid valve 47 is driven by the control unit to vary the opening of the valve 47 and thus vary the amount of flow permitted from the high pressure intake duct 32 at the compressor outlet to the pressure chamber 46 of the wastegate actuator 40. This variation in input flow, together with the return connection to the low pressure intake duct 31 through the bleed orifice 50, allows control of the pressure in chamber 46 at any level between the compressor inlet and compressor outlet pressure so as to permit operation of the wastegate valve whenever the available pressure is sufficiently high.

To control operation of the proportional solenoid valve 47 by the control unit 55, the crankshaft rotational position sensor 54 initiates each cycle an increasing voltage in the ramp generator 56, the rate of which is varied with respect to the engine speed indicated by sensor 53. The pressure sensor 52 holds the voltage level of the ramp generator at the point at which maximum pressure is reached in the cylinder, so that the ramp generator output represents the actual crank angle location at which peak pressure occurs at each cylinder cycle. This voltage is summed with the desired value supplied by reference generator 60 to the summing junction 59, and the resulting error signal is supplied to the pulse width modulating driver 62. The latter supplies controlled current to the solenoid valve 47 to open or close the valve and, thus, adjust the position of the wastegate valve 38 to vary the cylinder charging pressure to thereby reduce or eliminate the error, or deviation, between the actual and desired peak pressure locations.

Inasmuch as factors other than engine charging pressure may have a substantial, or even overriding, effect upon the location of peak pressure at each cylinder cycle, it may be necessary to include additional control devices in the engine control system to maintain control of parameters such as ignition spark timing in a manner which will permit or complement the operation of the turbine bypass control of the present invention. Thus, the system of the present invention may be combined with systems for controlling spark timing in any suitable manner that will accomplish the desired purposes without departing from the concepts disclosed. It should also be recognized that while the desired value for location of peak pressure may be a constant in which case the reference voltage generator 60 would be arranged to produce a constant voltage, it may also be desirable to provide for an adjustment of the reference voltage produced by the generator or for automatic control of a variation in the voltage in response to parameters such as engine load and speed. Such automatic control could, for example be accomplished in known manner through computer control systems currently utilized for the control of spark timing on certain automotive vehicles.

While the invention has been disclosed by reference to one specific embodiment chosen for purposes of illustration, it should be understood that numerous changes could be made in the details of construction and application of the various devices and concepts without departing from the spirit and scope of the inventive concepts described. Accordingly, it is intended that the invention not be limited to the described embodiment but that it have the full scope permitted by the language of the following claims.

The embodiments of the invention in which an exclusive property or privilege is claimed are defined as follows:

1. An internal combustion engine comprising
   at least one variable volume combustion chamber in which compressed charges are cyclically burned and expanded to produce power, whereby a cyclical peak pressure is reached at a measurable interval after each charge is compressed to its minimum volume,
   a charge supply system connected to deliver charges to the combustion chamber for compression and burning, the charging pressure in said supply system being functionally related to said peak pressure interval,
   a supercharger for increasing the charge pressure in said charge supply system, thereby altering said peak pressure interval,
   means for detecting said peak pressure interval and measuring the deviation of said interval from a reference value, and
   valve means coupled with said means for detecting said peak pressure interval for altering said charge pressure in a direction to minimize the deviation of said interval from said reference value and thereby desirably affect engine operation.

2. An internal combustion engine comprising
   at least one variable volume combustion chamber in which compressed charges are cyclically burned and expanded to produce power, whereby a cyclical peak pressure is reached at a measurable interval after each charge is compressed to its minimum volume,
   a charge supply system connected to deliver charges to the combustion chamber for compression and burning, the charging pressure in said supply system being functionally related to said peak pressure interval,
   an exhaust turbocharger for increasing the charge pressure in said charge supply system, thereby altering said peak pressure interval,
   means for detecting said peak pressure interval and measuring the deviation of said interval from a reference value selected to provide optimum engine efficiency, and
   wastegate valve means coupled with said means for detecting said peak pressure interval for varying turbocharger exhaust gas bypass flow and thereby altering said charge pressure in a direction to minimize the deviation of said interval from said reference value and thereby optimize engine operating performance and/or efficiency.

* * * * *